US005323185A

United States Patent [19]

Nagato et al.

[11] Patent Number: 5,323,185

[45] Date of Patent: Jun. 21, 1994

[54] RECORDING APPARATUS

[75] Inventors: Hitoshi Nagato, Tokyo; Yuzo Koike; Shuzo Hirahara, both of Yokohama; Yasuo Hosaka; Masafumi Mori, both of Tokyo, all of Japan

[73] Assignee: Kabushiki Kaisha Toshiba, Kawasaki, Japan

[21] Appl. No.: 956,070

[22] Filed: Oct. 2, 1992

[30] Foreign Application Priority Data

Oct. 3, 1991 [JP] Japan ................................. 3-256181

[51] Int. Cl.[5] ...................... G01D 15/06; G03G 15/20

[52] U.S. Cl. .................................... 346/159; 355/290

[58] Field of Search ................ 346/74.2, 159; 355/290

[56] References Cited

U.S. PATENT DOCUMENTS 5,253,023 10/1993 Hosaka et al. .................. 355/290 X

OTHER PUBLICATIONS

Journal of Applied Photographic Engineering "Magnetic Stylus Recording" A. R. Kotz Apr. 1981, vol. 7, No. 2, pp. 44–49.

IS & T's Seventh International Congress on Advances in Non-Impact Printing Technologies; vol. 1 T. Nishigaito et al., "New Priniting System Using A Mono--Component Conductive Magnetic Toner"; pp. 462–471; Oct. 6–11, 1991.

Electronics Jun. 30, 1981; pp. 40–41.

*Primary Examiner*—George H. Miller, Jr.

*Attorney, Agent, or Firm*—Oblon, Spivak, McClelland, Maier & Neustadt

[57] ABSTRACT

A recording apparatus includes an image carrier member, a member for forming a developing agent image by supplying a developing agent on the image carrier member, and a heating member capable of generating heat in a transfer region of the recording apparatus, wherein transfer and fixing are performed substantially simultaneously by the heating member. According to this invention, it is possible to realize a recording apparatus which consumes little power and requires only a short warm-up time. It is also possible to satisfactorily fix conductive developing agent on plain paper.

24 Claims, 8 Drawing Sheets

RECORDING APPARATUS

BACKGROUND OF THE INVENTION

1. Field of the Invention

The present invention relates to a recording apparatus applicable to a magnetic stylus recording system and various electrophotographic recording systems.

2. Description of the Related Art

Of various recording apparatuses, since an electrophotographic recording apparatus uses nonimpact recording, the apparatus produces low recording noise, can record clear characters, has a high recording speed, and has relatively low running cost. In recent years, therefore, the electrophotographic recording apparatus is used as an output terminal device of OA equipment, and its market has rapidly spread.

This electrophotographic recording apparatus will be briefly described below with reference to FIG. 1 which is a schematic view showing a recording section of a laser printer as one of electrophotographic recording apparatuses. As shown in FIG. 1, this electrophotographic recording apparatus uses a photoconductive drum 100. A charger 101 constituted by a corona charger uniformly charges the entire surface of the photoconductive drum 100 by, e.g., a negative charge to about −700 V. Laser light 102 is radiated on the photoconductive drum 100 in accordance with an image signal. Since the resistance of the photoconductive drum decreases only at a portion irradiated with the light, the negative charge at the portion irradiated with the laser light 102 is erased and an electrostatic latent image forms. Normally, a single semiconductor laser is used as a laser source, and light modulated in accordance with an image is scanned by a rotary polygon mirror. The electrostatic latent image thus formed is developed by a developing unit 103. That is, toner which is supplied from the developing unit 103 and consists of, e.g., coloring material fine particles negatively charged by reversal development is deposited on the portion of the electrostatic latent image formed on the photoconductive drum 100, from which the negative charge is removed, upon application of a development bias of about −500 V, thereby the electrostatic latent image is visualized. Recording paper 105 picked up by paper feed rollers 104 from a paper cassette (not shown) is fed in synchronism with the image signal and brought into contact with the photoconductive drum 100. In this contact portion, transfer of the visualized toner image onto the recording paper 105 is performed. A transfer charger 106 applies a positive charge from the lower surface side of the recording paper 105. This positive charge attracts the toner image formed on the photoconductive drum 100 by the negatively charged toner particles to the recording paper 105, thereby transferring the toner image onto the recording paper 105. The recording paper 105 to which the image is transferred is separated from the photoconductive drum 100 by a separating charger 107. A fixing unit 111 constituted by heat rollers 110 fixes the toner particles on the recording paper 105 by applying heat and a pressure to the toner particles, and in this manner recording is finished. Note that some toner particles are not transferred to the recording paper 105 but remain on the photoconductive drum 100. A cleaner constituted by a cleaning blade 108 scrapes off these residual toner particles, thereby cleaning the drum 100. Thereafter, an erasure lamp 109 constituted by, e.g., LEDs exposes the entire surface of the photoconductive drum 100 to erase the electric charge on the drum. In this manner, the electrophotographic recording apparatus forms an image through steps of charging, latent image formation, development, transfer, and fixing. The photoconductive drum is cleaned in the last cleaning step and resued. A general electrophotographic recording apparatus basically has the arrangement as described above although individual steps may be more or less modified depending on the type of apparatus.

A laser printer has been briefly explained above as a representative example of the electrophotographic recording apparatus. However, the electrophotographic recording apparatus is not limited to this laser printer, but various apparatuses using other light-emitting elements as a recording head for writing an electrostatic latent image have been developed and produced. A laser printer scans a pixel point with light generated by a single laser source by using a polygon mirror which mechanically rotates at a high speed or a hologram. In terms of the miniaturization and manufacturing cost of an apparatus, however, a solid scanning system using an array light source has attracted considerable attention recently. For example, an electrophotographic recording apparatus using a head in which light-emitting elements, such as LEDs, liquid crystal shutters, EL elements, plasma-emitting elements, or phosphors, or light-shutting elements are arrayed has been developed and put into practical use. An "optical printer" is a general term for these electrophotographic recording apparatuses. Such an electrophotographic recording apparatus is used as a printer or an output apparatus of a digital copying machine.

A conventional analog copying machine is also an electrophotographic recording apparatus, in which an original is irradiated with light generated by, e.g., a fluorescent lamp, and light reflected by the original is guided to a photoconductor to form an electrostatic latent image, thereby copying the original. A recording system called an ion flow recording or ion deposition recording is also one of electrophotographic recording systems. In this ion flow or ion deposition recording system, a dielectric is used in place of a photoconductor, and ions are ejected from arrays of small holes to record an electrostatic latent image on the dielectric.

Since the electrophotographic recording apparatus has various advantages as described above, a large number of these apparatuses are used as output terminal devices of OA equipment recently. Also, various systems for the apparatus of this type have been developed and put into practical use, and this has rapidly spread the market of the apparatus.

In these electrophotographic recording apparatuses, as described above, recording is performed through steps of charging, latent image formation, development, transfer, and fixing. One advantage of the electrophotographic recording apparatus is that energy required to form an electrostatic latent image is very small. For example, a latent image of one pixel point can be formed by applying an optical energy of about $10^{-6}$ to $10^{-5}$ J/cm$^2$ to a photoconductor. To form one pixel point on recording paper using a thermal transfer recording apparatus, on the other hand, a large recording energy of about 2 to 6 J/cm$^2$ is required. In this respect alone, it seems that the electrophotographic recording apparatus is very efficient and its consumption power is very small compared to that of a thermal transfer recording apparatus. In an actual electrophotographic recording apparatus, however, the consumption power is normally about 1.5 KW in the case of an apparatus capable of recording 8 to 12 sheets of paper per minute, and is a minimum of about 500 to 600 W in a low-speed apparatus capable of recording 4 sheets per minute. These values are equivalent to or larger than the value of consumption power of a thermal transfer recording apparatus. Of the steps of the recording process of the electrophotographic recording apparatus, those from recharging to transfer of a toner image onto plain paper are realized by a very small energy. However, the last step of fixing the toner image on the recording paper requires a large energy, and this increases the consumption power of the electrophotographic recording apparatus as a whole. This fixing energy is, for example, about several tens $J/cm^2$, which is a value about ten times the recording energy of a thermal transfer recording apparatus.

Recently, most electrophotographic recording apparatuses incorporate a fixing unit using heat and a pressure generated by a heat roll. This fixing unit using a heat roll is safe because it is free from a danger of a fire, and its heat capacity is large enough to keep image quality stable. The fixing unit also has an advantage that its fixing power is very high compared to that obtained by pressure fixing. However, since the heat capacity of the heat roll is set large, it takes a long time to raise the temperature of the heat roll up to a temperature required for fixing. Therefore, the apparatus cannot be used immediately after its power switch is turned on but requires a warm-up time of about several minutes before it can be used. In addition, a heater which consumes large power is required because the heat capacity of the heat roll is large, so a lamp of about 500 to 1,000 W is generally incorporated in the roller. That is, since the conventional electrophotographic recording apparatus uses a heat roll having a large heat capacity as a fixing unit, the apparatus requires a large consumption power and a long warm-up time. Especially when miniaturization of the electrophotographic recording apparatus is taken into account, the apparatus has problems that a heat roll having a large consumption power and a large heat capacity is used as a fixing unit and that such a fixing unit must be provided independently of an image forming drum. In addition, to prevent an influence of heat on the image forming drum, the fixing unit and the image forming drum must be arranged as far as possible. These problems make it difficult to miniaturize the electrophotographic recording apparatus.

Several image forming methods using conductive magnetic toner and recording electrodes were also reported in the past. Examples of the method are described in A. R. Kotz: J. Appl. Phot. Eng. 7, (2), page 44, 1981 and K. Okuna et. al.: Proc. Japan Hardcopy 91, page 117, 1991. These recording methods are almost the same in the process of forming an image. FIG. 2 shows the recording principle of these methods. Referring to FIG. 2, an image carrier 100 is constituted by a recording layer 101 consisting of an insulating layer and a conductive layer 102 connected to the ground potential. Carrying of conductive magnetic toner 31 is performed by a fixed sleeve 33 and an internal magnet roller 32 of the sleeve 33. Since the toner is magnetic toner, it is held in a state forming a magnetic brush formed on the sleeve 33 by the magnetic force of the magnet roller 32. In this condition, the toner 31 is carried on the fixed sleeve 33 outside the magnet roller 32, which is magnetized to have N and S poles alternately, by rotation of the magnet roller 32 in a direction opposite to the direction of rotation of the magnet roller 32 (indicated by an arrow of a broken line in FIG. 2). Recording electrodes 34 are adhered to a position on the fixed sleeve 33 opposite to the image carrier 100. The recording electrodes 34 are arrays of a large number of electrodes, and each electrode 34 has a driver 35 for switching on/off a recording signal in accordance with image data. When a voltage is applied to the recording electrodes 34, an electric charge flows through the layer of the toner 31 because the toner 31 is conductive toner, and this charge reaches toner particles in contact with the recording layer 101 of the image carrier 100. The capacitance of this toner is charged. An electric charge having a polarity opposite to that of the recording voltage is induced in the conductive layer 102 of the image carrier 100. When a Coulomb force generated between the charge of the toner and the charge of the opposite polarity induced in the conductive layer 102 becomes larger than the magnetic force holding the magnetic toner 31, the toner particles are transferred onto the image carrier 100 to form an image 36.

This recording system is similar to an electrophotographic printer or an electrostatic recording apparatus in a sense that the image 36 is formed on the image carrier 100 by using the toner 31. In the electrophotographic printer or electrostatic recording apparatus, however, an electrostatic latent image is first formed on an image carrier and then developed using toner to form a visual image. In the method using conductive magnetic toner, on the other hand, a toner image is formed directly on an image carrier without forming any latent image. Therefore, since no discharge phenomenon is used in this recording apparatus unlike in the electrophotographic printer or electrostatic recording apparatus, the apparatus requires neither high-voltage parts, such as a charger, nor a high-voltage power source. The voltage to be applied to the recording electrodes is also a very low voltage of about 30 V. That is, this recording apparatus has a characteristic feature in that all the voltages used are low voltages. In addition, although a part like a charger produces a harmful substance such as ozone, this recording apparatus does not use a charger, so there is no possibility of producing such a harmful substance. Furthermore, since the number of recording steps is naturally decreased, the recording apparatus can be simplified and miniaturized. Also, this recording apparatus does not perform optical recording using a photoconductor unlike an electrophotographic printer. This makes it possible to use an inexpensive image carrier having a long service life and makes it unnecessary to provide a dark space. The nonuse of optical parts realizes miniaturization of the apparatus.

As described above, the method of forming a toner image directly on an image carrier by using conductive magnetic toner has a large number of advantages compared to a conventional electrophotographic recording apparatus or electrostatic recording apparatus. However, practical examples of this recording apparatus are very few compared to those of the electrophotographic recording apparatus or electrostatic recording apparatus. One of the largest reasons for this is that the use of conductive toner makes it very difficult to transfer a toner image formed on an image carrier onto plain paper. To transfer a toner image from an image carrier to plain paper, an electrostatic transfer method is generally adopted in an electrophotographic recording apparatus. In this method, plain recording paper is fed to a transfer unit and brought into tight contact with an image carrier in this unit. An electric field by which charged toner is electrostatically attracted to the recording paper is formed between the recording paper and the image carrier. The electrostatic transfer method is classified into corona transfer and roller transfer in accordance with electrostatic field forming means. In the corona transfer method, a corona charger applies an electric charge having a polarity opposite to that of charged toner to the lower surface of recording paper. The charged toner is transferred to the recording paper by an electrostatic force acting between the charged toner and the charge of the opposite polarity. In the roller transfer method, on the other hand, a conductive rubber roller applied with a voltage or a dielectric roller obtained by forming a dielectric film on the surface of a conductive rubber roller is urged against the lower surface of recording paper to form an electric field. The basic principle of electrostatic transfer is substantially the same in these two methods; charged toner particles are attracted and transferred from an image carrier to recording paper by an electrostatic force.

When, however, the electrostatic transfer as described above is performed using conductive toner, image quality is significantly degraded. The reason for this is that the electric charge of toner particles leaks to recording paper because the toner is conductive, and this makes it impossible to reliably hold the toner particles on the recording paper by an electrostatic force. This disables transfer of a toner image onto plain paper. Even if an image is transferred, the transferred image is a disturbed one.

To solve these problems, a transfer method other than the electrostatic transfer is adopted when conductive toner is to be used. Normally, a pressure transfer method is used. In the pressure transfer method, a high pressure is applied to a toner image and recording paper to bring them into tight contact with each other, and toner particles softened in this manner are transferred to the recording paper. Although the pressure transfer method has an advantage of a high transfer efficiency, a very high pressure must be applied in this method. This requires a high mechanical strength or a large drive torque. Therefore, it is difficult to use this pressure transfer method in a compact recording apparatus. The method also has a drawback in that only an image carrier having strength high enough to withstand a high pressure can be used. In addition to the pressure transfer method, it is also possible to use a method in which toner particles are transferred to an adhesive intermediate medium by using the adhesion of the medium, and the transferred toner image is further transferred from the intermediate medium to recording paper and fixed on it by using heat or the like. This method has advantages of a high transfer efficiency and little degradation in image quality. However, since the method requires retransferring a toner image twice, an apparatus for this method is increased in size and complicated. It is also possible to adopt a method in which a toner image is transferred not to plain paper but to special insulating recording paper in order to prevent a leakage of an electric charge of charged toner particles.

As described above, although the recording apparatus using conductive toner has several advantages, it has not been widely used because transfer to plain paper is not easy.

SUMMARY OF THE INVENTION

It is the first object of the present invention to provide a recording apparatus for forming a developing agent image on an image carrier using a developing agent and transferring this developing agent image onto a recording medium to form an image on the medium, which is small, consumes little power, and substantially requires no warming up.

It is the second object of the present invention to provide a recording apparatus for forming a developing agent image on an image carrier using a conductive developing agent as a developing agent and transferring this developing agent image onto a recording medium to form an image on the medium, which can form an image with a high image quality on any recording medium such as plain paper, and which is small, consumes little power, and requires no warming up.

A recording apparatus of the present invention has the following four aspects.

According to the first aspect of the present invention, there is provided a recording apparatus comprising an image carrier member including heating means having a first conductor, a pressure-sensitive conductive resin layer formed on the first conductor, and a second conductor formed on the pressure-sensitive conductive resin layer, and an image carrier layer formed on the heating means, developing agent image forming means for forming a developing agent image by supplying a developing agent on the image carrier layer, and pressurizing means urged against the image carrier member, wherein a recording medium is fed between the image carrier layer of the image carrier member and the pressurizing means to transfer the developing agent supplied on the image carrier layer onto the recording medium, and a current is flowed through a pressurized region of the image carrier member to generate Joule heat, thereby thermally fixing the developing agent transferred to the recording medium by the generated Joule heat.

According to the second aspect of the present invention, there is provided a recording apparatus comprising an image carrier member having an image carrier layer, developing agent image forming means for forming a developing agent image by supplying a developing agent on the image carrier layer, and pressurizing means urged against the image carrier layer and including heating means having a first conductor, a pressure-sensitive conductive resin layer formed on the first conductor, and a second conductor formed on the pressure-sensitive conductive resin layer, wherein a recording medium is fed between the image carrier layer and the pressurizing means to transfer the developing agent supplied on the image carrier layer onto the recording medium, and a current is flowed through a pressurized region of the pressurizing means to generate Joule heat, thereby thermally fixing the developing agent transferred to the recording medium by the generated Joule heat.

According to the third aspect of the present invention, there is provided a recording apparatus comprising an image carrier member including an image carrier layer, developing agent image forming means for forming a developing agent image by supplying a developing agent on the image carrier layer, an intermediate image carrier member provided on the image carrier member and including heating means having a first conductor, a pressure-sensitive conductive resin layer formed on the first conductor, and a second conductor formed on the pressure-sensitive conductive resin layer, and an intermediate image carrier layer formed on the heating means, and pressurizing means urged against the image carrier member, wherein after the developing agent image is transferred onto the intermediate image carrier layer, a recording medium is fed between the intermediate image carrier layer having the transferred developing agent image and the pressurizing means to transfer the developing agent image formed on the intermediate image carrier layer onto the recording medium, and a current is flowed through a pressurized region of the intermediate image carrier member to generate Joule heat, thereby thermally fixing the developing agent image transferred to the recording medium by the generated Joule heat.

According to the fourth aspect of the present invention, there is provided a recording apparatus comprising a belt-like image carrier member including a conductive layer and a recording layer formed on the conductive layer, developing agent image forming means for forming a developing agent image by supplying a conductive developing agent on the recording layer, heating means provided on the image carrier member, and pressurizing means for urging the heating means via the image carrier member.

In the fourth aspect of the present invention, the developing agent image forming means is preferably magnetic stylus recording means or magnedynamics recording means.

The heating means is preferably a combination of a first conductor, a pressure-sensitive conductive resin layer formed on the first conductor, and a second conductor formed on the pressure-sensitive conductive resin layer, or a solid planar heater.

The use of the recording apparatus of the present invention allows to simultaneously perform transfer and fixing of a developing agent image formed on the image carrier member onto a recording medium by performing transfer by applying a voltage while the heating means using the pressure-sensitive conductive resin is urged, or by providing a heater in the transfer section.

In the image forming roller using the pressure-sensitive conductive resin, for example, the image carrier roller, the pressure roller, and a recording medium are urged against one another. Since the resistivity of the pressure-sensitive conductive resin decreases only in this urged portion, a current flow is concentrated in this portion to generate a Joule heat. A developing agent is transferred to the recording medium and at the same time fixed on it by this Joule heat. Since heat is generated in the thin pressure-sensitive conductive resin layer and only in the portion where the image forming drum is urged against the recording medium, the heat capacity in this portion to be heated is small. For this reason, energy required for fixing is very small compared to that required by a conventional heat roller. With this arrangement, it is possible to realize a recording apparatus which consumes little power and requires only a short warm-up time. In addition, since transfer and fixing of a developing agent are performed substantially simultaneously, no independent fixing unit need be provided, and this allows miniaturization of the recording apparatus.

When a conductive developing agent is used, charger transfer to plain paper is generally impossible. Therefore, a high pressure is used to perform transfer, and this increases the size of a recording apparatus. According to the present invention, however, transfer and fixing of toner are performed using heat. This not only realizes power saving, a small size, and a short warm-up time of an apparatus but also facilitates transfer of a conductive developing agent onto plain paper.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENT

The present invention will be described in detail below with reference to the accompanying drawings.

The first aspect of the present invention provides a recording apparatus comprising an image carrier member including heating means having a first conductor, a pressure-sensitive conductive resin layer formed on the first conductor, and a second conductor formed on the pressure-sensitive conductive resin layer, and an image carrier layer formed on the heating means, developing agent image forming means for forming a developing agent image by supplying a developing agent on the image carrier layer, and pressurizing means urged against the image carrier member, wherein a recording medium is fed between the image carrier layer of the image carrier member and the pressurizing means to transfer the developing agent supplied on the image carrier layer onto the recording medium, and a current is flowed through a pressurized region of the image carrier member to generate Joule heat, thereby thermally fixing the developing agent transferred to the recording medium by the generated Joule heat.

Figure 3:
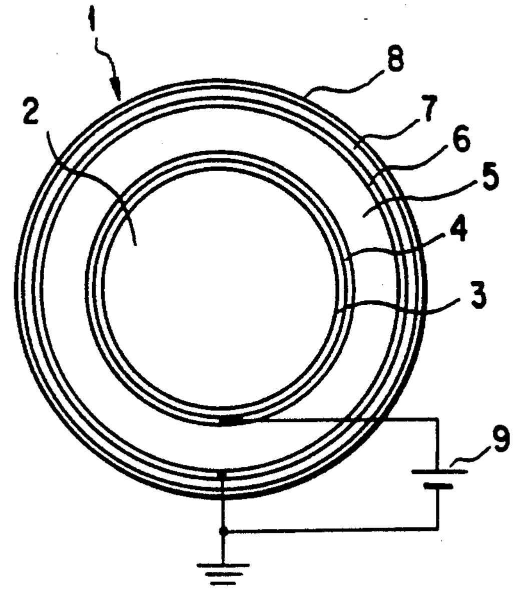
FIG. 3 is a schematic view showing an example of an image carrier member used in the first aspect of the present invention.

FIG. 3 shows the image carrier member of the recording apparatus according to the first aspect of the present invention.

As shown in FIG. 3, an image forming drum 1 used as the image carrier member has a structure in which a heat insulating layer 3 is formed on a core roller 2, and a conductive layer 4 having a small resistivity is formed on the heat insulating layer 3. A pressure-sensitive conductive rubber layer 5 is formed on the conductive layer 4, and another conductive layer 6 is formed on the pressure-sensitive conductive rubber layer 5. That is, the pressure-sensitive conductive rubber layer 5 is sandwiched between the two conductive layers 4 and 6. A power source 9 is connected between the conductive layers 4 and 6. An insulating layer 7 is formed on the outer conductive layer 6. An offset inhibiting layer 8 can also be formed outside the insulating layer 7 as needed. The offset inhibiting layer 8 inhibits adhesion of toner to the image forming drum 1. FIG. 3 shows an embodiment of a representative arrangement of the image forming drum 1 of the present invention, but the first aspect of the present invention is not limited to this arrangement. That is, the image forming drum need only have a structure in that at least an image carrier layer is formed on the pressure-sensitive conductive rubber 5. The image forming drum shown in FIG. 3 has the outer dielectric layer 7 assuming that the apparatus is applied to ion deposition recording. If, however, the present invention is to be applied to electrophotographic recording in which a recording head using ordinary light is provided, a photoconductive layer may be used in place of the dielectric layer 7. In this manner, the present invention can be applied to various types of electrophotographic recording by changing the type of outer image carrier layer of the image forming drum.

A practical image forming method according to ion deposition recording performed by a recording apparatus of the present invention using the image forming drum 1 shown in FIG. 3 will be described below with reference to FIG. 4. In the recording apparatus of the present invention, a corona charger 10 uniformly charges the surface of the image forming drum 1 by, e.g., a negative charge to about −600 V. An ion recording head 11 performs ON/OFF control of, e.g., positive ions in accordance with an image signal so that the positive ions are selectively deposited on the uniformly charged image forming drum 1. Since the negative potential on the image forming drum 1 is neutralized by these positive ions, an electrostatic latent image 13 is formed on the image forming drum 1. This electrostatic latent image 13 is developed by a developing unit 14 to form a visual image 15. That is, toner consisting of coloring material fine particles is generally negatively charged and deposited on portions where the negative charged is erased by ion deposition. The electrostatic latent image 13 is developed into the visual image 15 by so-called reversal development. Assume that the developing unit 14 is of, e.g., a two-component development type and a bias voltage of about −300 V is applied to a development sleeve. However, this developing means is not limited to the two-component development system but may be a single-component development system.

The process up to this point is similar to that in ordinary ion deposition recording. In an ordinary electrophotographic recording apparatus, the visual image 15 is then transferred to plain recording paper 16 as a recording medium, and an unfixed toner image is fixed by a fixing unit to complete an image. Likewise, in the recording apparatus of the present invention, the image forming drum 1 is urged against a pressure roller 17 via the recording paper 16 to constitute a roller transfer unit. The characteristic feature of the recording apparatus of the present invention is that a toner image is transferred from the image forming drum 1 to the recording paper 16 and at the same time fixed on the recording paper 16. To realize a heating function for this fixing, the image forming drum 1 of the present invention uses the pressure-sensitive conductive rubber 5. FIG. 5 shows the pressure-resistivity characteristic of the pressure-sensitive conductive rubber 5. In FIG. 5, the resistivity is represented by a logarithm. As shown in FIG. 5, the resistivity of the pressure-sensitive conductive rubber 5 is decreased to $1/10^{-5}$ to $1/10^{-6}$ upon application of a pressure. To transfer the developed visual image 15 onto the recording paper 16, the image forming drum 1 is urged against the recording paper 16 by the pressure roller 17. As shown in FIG. 4, a portion of the pressure-sensitive conductive rubber 5 in tight contact to the recording paper 16 is deformed by the applied pressure. The pressure-sensitive conductive rubber 5 is sandwiched between the two conductive layers 4 and 6, and a voltage from the power source 9 is applied across these conductive layers. In a normal condition, however, the resistivity of the pressure-sensitive conductive rubber 5 is very high as shown in FIG. 5, so almost no current flows through it. When the image forming drum 1 is urged against the recording paper 16, on the other hand, the resistivity in this urged portion becomes very low to flow a large current. This current produces Joule heat in the pressure-sensitive conductive rubber layer 5. The toner image is thermally transferred onto the recording paper 16 and substantially at the same time fixed on it by this Joule heat. In general roller transfer, a bias voltage of about +800 V is applied to the surface of the pressure roller 17 to perform transfer. In the method of the present invention, however, transfer of the toner to the recording paper is performed primarily by thermal transfer. Therefore, although a bias voltage can also be applied in this method, the effect of application of the voltage is insignificant. After the image is transferred to the recording paper 16 as described above, the residual toner on the image forming drum 1 is removed by a cleaner unit 18. The cleaned image forming drum 1 is again charged by the charger 10 to repeat the image forming process.

Figure 4:
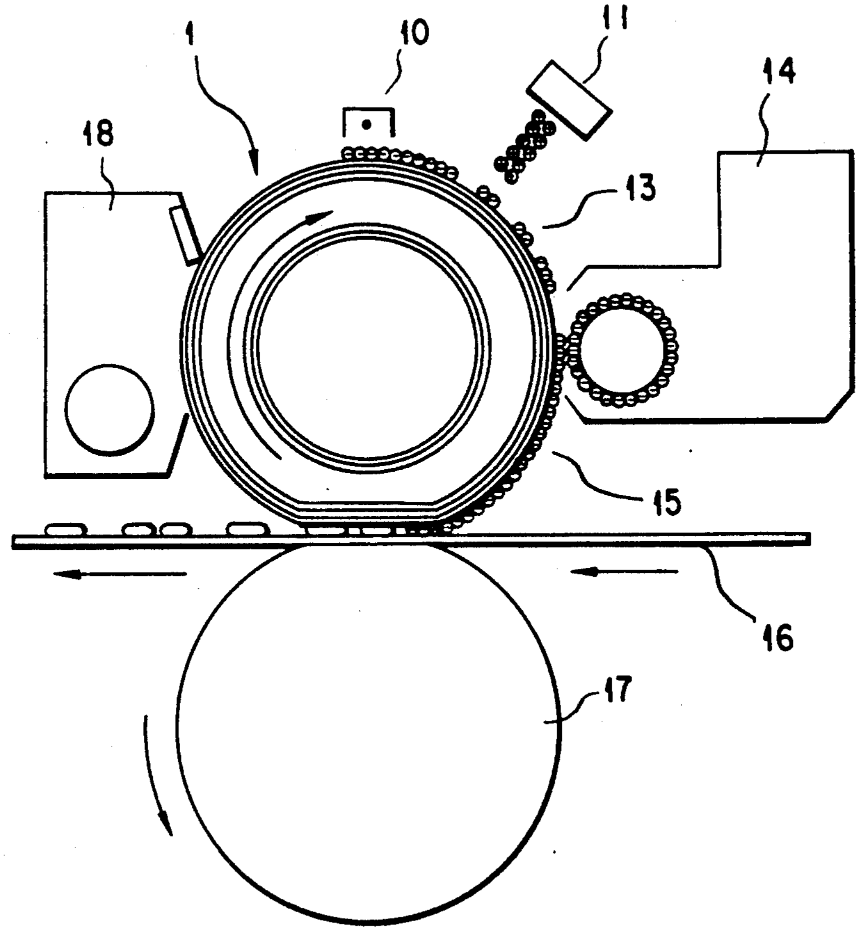
FIG. 4 is a schematic view showing a recording apparatus according to the first aspect of the present invention.
Figure 5:
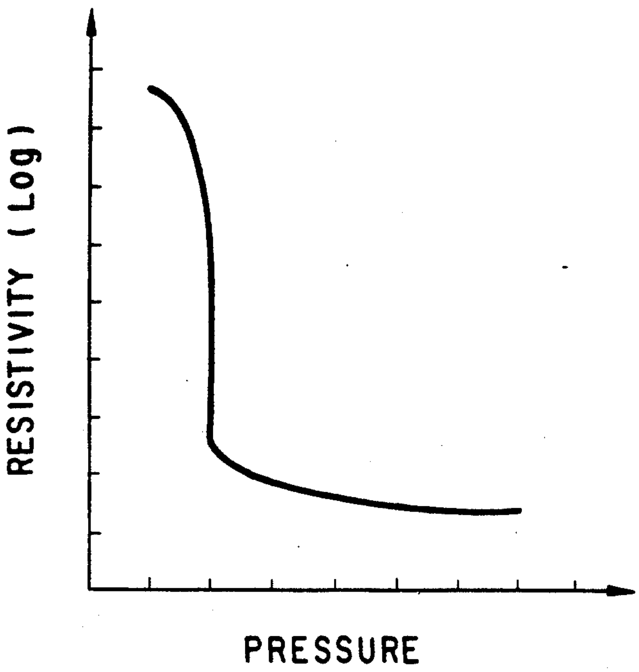
FIG. 5 is a graph showing the relationship between the pressure and the resistivity of pressure-sensitive conductive rubber.

Although the recording apparatus shown in FIG. 4 incorporates the cleaner unit 18, an offset inhibiting layer having appropriate characteristics may be formed as the outermost layer of the image forming drum 1. In this case, since the offset inhibiting layer prevents residual toner having an adverse effect on an image to be recorded next from remaining on the image forming drum 1, the cleaner unit 18 can be omitted. The recording apparatus having the offset inhibiting layer 8 can be applied to a so-called cleanerless system or a method using a conductive brush in place of a cleaner. A material having a large contact angle with respect to a liquid is suitable as the offset inhibiting layer 8. An example is a fluorine resin or Teflon having a thickness of about 10 μm. Note that the offset inhibiting layer 8 need not be used when the cleaner unit 18 is used. This recording apparatus is applicable not only to an ion deposition recording system but also to an electrophotographic recording system having a general optical head which uses an organic photoconductive layer, such as OPC, or an image carrier layer formed by vapor-depositing or coating, e.g., selenium or zinc oxide in place of the dielectric layer 7. The recording apparatus of the present invention can also be applied to an electrostatic recording system for recording a discharge phenomenon from a multi-stylus electrode. The power source 9 for enabling fixing of the image forming roller shown in FIG. 3 is not constantly connected to the two conductive layers sandwiching the pressure-sensitive conductive rubber. This is so because the image forming drum 1 is in tight contact with the pressure roller 17 even in the absence of the recording paper 16. That is, if the power source is kept connected to the conductive layers in this condition, a current undesirably flows constantly. Therefore, the power source 9 for fixing is connected to the conductive layers only when needed.

The developing unit can be of either a general two-component development type or a single-component development type. Especially in a development system using conductive toner, an image cannot be clearly transferred to plain paper by using a corona charger. In this case, therefore, transfer is preformed by applying a very high pressure or by using specific paper for recording. In the recording apparatus of the present invention, a toner image is transferred to recording paper and fixed on it by heat generated by the image forming drum. This realizes recording to plain paper even in a development system using conductive toner. It is a great advantage of the present invention to be able to use conductive toner.

In the case of a roller using pressure-sensitive conductive rubber, a pressure-sensitive conductive rubber layer as a heating portion is thin, and heat is generated only from an urged portion, unlike an ordinary heat roller which is entirely heated constantly That is, since a heater is of a small heat capacity type and a heat-on-demand type, it is possible to protect a photoconductive layer and an insulating layer against a temperature rise or to return from a high-temperature state during fixing to a cold state when entering another process. This is also a notable characteristic obtained by the use of the pressure-sensitive conductive rubber roller. Heat, however, is sometimes stored in the roller. Especially as the recording rate is increased, heat is stored more easily because a large transfer/fixing energy is required instantaneously and the rotating speed of the roller is also increased. In the case of ion deposition recording using an insulating layer or electrostatic recording, it is more or less possible to prevent an adverse influence when conductivity is increased by heat. However, such an influence is sometimes unavoidable in high-speed recording. The storage of heat is a problem especially when a photoconductor is used. To prevent such an inconvenience, a cooling unit may be provided after the cleaner unit 18 in the recording apparatus shown in FIG. 4. The simplest method as the cooling unit can be achieved only by bringing a metal roller having a high thermal conductivity into contact with the image forming roller. In this embodiment, the image forming drum is used as an image carrier, but the image carrier is not limited to a drum provided that it has the same structure as described above. An example is a sheet-like or endless belt-like image carrier having an internal pressure-sensitive conductive rubber layer sandwiched between conductive layers.

In the apparatus of the present invention, the image carrier member and the pressure roller are brought into tight contact with each other via a recording medium in the step of transferring a developing agent image to the recording medium. When such a tight contact is produced, the internal pressure-sensitive conductive rubber of the image forming roller or the pressure roller is urged, so the resistivity in this urged portion of the pressure-sensitive conductive rubber becomes very small. As a result, a current flows from the power source connected to the conductive layers sandwiching the pressure-sensitive conductive rubber into the urged portion of the rubber. Toner is melted by Joule heat generated by this current and transferred to and fixed on the recording medium at the same time. Since transfer and fixing can be performed simultaneously in this manner, no independent fixing unit need be provided, and a compact recording apparatus can be realized. In addition, the layer thickness of the pressure-sensitive conductive resin is as very small as several millimeters or less, and optimally several tens μm, and only the urged portion generates heat. That is, the heat capacity is very small compared to that in the case of fixing performed by a conventional heat roller system. Therefore, a recording apparatus which consumes little power and requires only a short warm-up time can be realized.

In the present invention, transfer of a toner image from the image forming drum to a recording medium and fixing of the transferred image on it are performed almost simultaneously. That is, unlike a conventional apparatus in which a fixing unit is arranged apart from an image forming drum, the fixing unit is provided in contact directly or indirectly with the image forming drum. To simultaneously perform transfer and fixing, pressure-sensitive conductive rubber, for example, is used. That is, a thin layer of pressure-sensitive conductive rubber is formed on a roller such that the rubber layer is sandwiched between two conductive layers, and a power source is connected between these conductive layers. Such a layer is formed inside the image forming layer or inside a pressure roller for urging a recording medium against the image forming roller.

Figure 6:
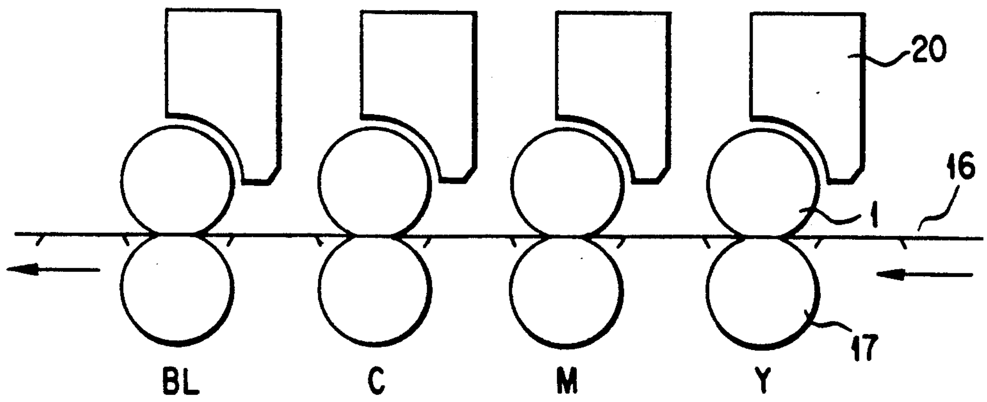
FIG. 6 is a schematic view showing another recording apparatus according to the first aspect of the present invention.

FIG. 6 shows another recording apparatus according to the first aspect of the present invention. This recording apparatus is an application of the present invention as a color recording apparatus obtained by connecting in series four monochromatic recording apparatuses shown in FIG. 4. Referring to FIG. 6, parts such as the charger 10, the recording head 11, and the developing unit 14 shown in FIG. 4 are generally represented by an image forming unit 20 for simplicity. The image forming unit 20 also incorporates the cleaner unit 18 except when it is of a cleanerless type. The pressure roller 17 is urged against the image forming drum 1, and recording paper 16 passes between these two members. Although this arrangement of the recording unit is the same as the monochromatic recording unit shown in FIG. 4, a color recording apparatus can be realized by arranging three or four these recording units. As shown in FIG. 6, a Y (yellow) image is formed first in this recording apparatus. This Y image is transferred to the recording paper 16 and fixed on it at the same time. The recording paper 16 on which the Y image is thus recorded is fed to a position below a unit for forming an M (magenta) image. At this position, the M image is transferred to and at the same time fixed on the Y image already formed on the recording paper 16. Subsequently, a C (cyan) image is similarly transferred to and at the same time fixed on the Y and M images of the recording paper 16, thereby completing a color image. Although the color image can be formed by overlapping toner images of three colors, Y, M, and C as described above, a BL (black) image can also be formed lastly in order to obtain a sharp black color.

The characteristic feature of color image formation of this method is to perform transfer and fixing of an image with respect to the recording paper 16 for each color. One problem of this method of forming a color image by sequentially overlapping toner images is that if an unfixed image is formed on an intermediate recording medium or recording paper and fed to the subsequent transfer unit, this image is sometimes rubbed or electrically influenced upon transfer of the next color image to result in a disturbed image. Another problem is that toner components of different colors are mixed in a single developing unit. In the color image forming apparatus, after a toner image of the first color is transferred to recording paper or an intermediate recording medium, a toner image of the next color is transferred onto it. In this case, some toner particles of the first color may be reversely transferred from the recording paper or intermediate recording medium to the image forming drum. If these toner particles of the first color return to a developing unit storing toner particles of the second color, toner particles of different colors are mixed together in one developing unit. The problem of color mixing caused by reverse transfer is serious especially when cleanerless type developing units are used.

To solve these problems, a conventional color recording apparatus has fixing units in a one-to-one correspondence with a plurality of colors to independently perform fixing for each color image. Since, however, each fixing unit is of a heat roller type, the size of the entire color recording apparatus is increased if the fixing units are provided for the individual colors.

In the color electrophotographic recording apparatus of the present invention, on the other hand, toner of each color is transferred to and fixed on recording paper substantially at the same time. This advantageously solves the above problems without increasing the size of the apparatus.

Another problem of a conventional color electrophotographic recording apparatus is that the total thickness of toner layers is large because four toner layers are stacked, so a large energy is required to fix these layers on recording paper. If, on the other hand, toner is imparted an ability to facilitate conduction of heat to enable fixing of a thick layer, sticking of the toner to the roller or the like may occur. In the recording apparatus of the present invention, however, color images are fixed one after another, and this allows perform fixing without applying any large energy. Also, the fixing energies need not be the same among the image forming units of the respective colors. That is, although heating must be performed by a satisfactory energy in transfer and fixing of the last color, transfer and fixing of another color image before the last one require only an energy by which toner particles are temporarily fixed without being reversely transferred.

Figure 7:
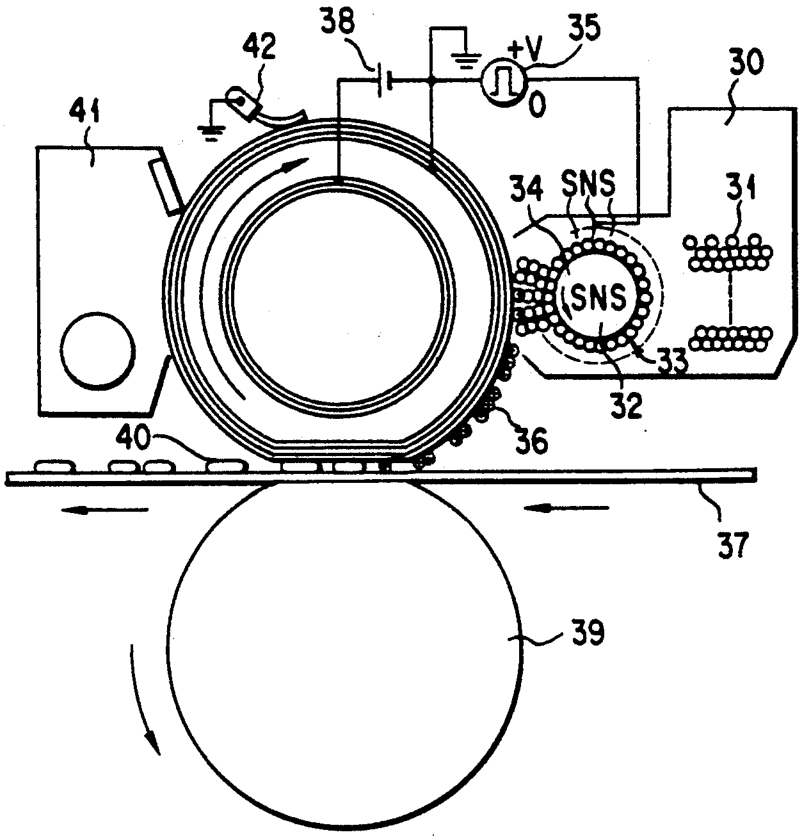
FIG. 7 is a schematic view showing still another recording apparatus according to the first aspect of the present invention.

FIG. 7 shows still another recording apparatus according to the first aspect of the present invention.

This apparatus adopts a system in which a multistylus electrode injects an electric charge directly to conductive toner to form a visual image directly without forming a latent image. This system is different from a system for forming an electrostatic latent image on a photoconductive layer by using an optical head, a system for forming an electrostatic latent image on a dielectric by using discharge from a large number of stylus electrodes, or a system for forming an electrostatic latent image by controlling ON/OFF of ions and developing the obtained electrostatic latent image by a developing unit, thereby forming a visual image. Since each of these systems uses conductive magnetic toner, it is difficult to transfer a toner image onto plain paper. In the case of the present invention, however, it is possible to perform transfer to plain paper as described above. FIG. 7 shows an embodiment in which the first aspect of the present invention is applied to a direct image forming system using conductive magnetic toner.

Referring to FIG. 7, a developing unit 30 for forming a toner image is disposed around the image forming roller 1. This developing unit 30 stores conductive magnetic toner 31. A magnet roll 32, which is magnetized to have opposite magnetic poles alternately, rotates in a direction indicated by an arrow in FIG. 7 in a sleeve 33 consisting of a conductive material such as aluminum. This rotation carries the conductive magnetic toner 31 on the sleeve 33 in a direction opposite to the direction indicated by the arrow. The toner thus carried forms a magnetic brush and is brought into contact with the image forming roller 1 as shown in FIG. 7. A recording electrode 34 is bonded on the sleeve 33 at a position opposite to the image forming drum 1. The recording electrode 34 is actually constituted by a large number of electrodes. Assuming that the resolution is 400 dots/inch and the image forming drum 1 corresponds to the width of an A4 recording paper, a total of 3,000 or more independent recording electrodes 34 are arranged. Each recording electrode 34 is provided with a driver (not shown) for applying a recording signal 35 in accordance with an image signal. The recording signal 35 is based on the ground potential of the outer conductive layer 6 of the image forming roller 1. When recording is to be performed, for example, a voltage of +V (about 30 V) can be applied to the recording electrodes 34 by the recording signal 35.

The developing unit 30 used in this recording apparatus has the following function. That is, when the recording signal is applied to the individual recording electrodes 34 in accordance with an image signal, this recording voltage is applied to the end of toner particles forming a brush by a magnetic force because the conductive magnetic toner 31 is used. The end of the brush formed by the conductive magnetic toner 31 is in contact with the insulating layer or the dielectric layer formed on the image forming drum 1. For example, when the spike of the conductive magnetic toner 31 applied with a voltage of +30 V is brought into contact with the insulating layer, a negative charge is induced in the outer conductive layer 6 connected to the ground potential. Therefore, since the electrostatic force of toner particles in a place where the voltage is applied by the recording electrodes 34 becomes larger than the magnetic force forming the brush, these toner particles are transferred to the image forming drum 1. An electrostatic force for attracting toner particles toward the image forming drum 1 is not generated in a portion corresponding to the recording electrodes 34 not applied with the recording signal 35. Therefore, toner particles in such a portion are carried on the sleeve 33. In this manner, a developed image 36 is formed on the image forming drum 1. In the recording apparatus of this type, the toner image 36 is not formed by developing a latent image but formed directly on the image forming drum 1. Therefore, the arrangement of the apparatus is very simple. This image forming method was proposed by Kotz et. al. in 1981 and is called a magnetic stylus recording system.

Although forming the toner image 36 on the image forming drum 1 is easy as described above, it is difficult to transfer the toner image 36 onto plain paper because of the use of conductive toner. In general, the image is transferred to plain paper by applying a very high pressure or transferred to insulating recording paper. Alternatively, the image may be transferred to recording paper or an intermediate recording medium which is mechanically adhesive. In the present invention, the toner image 36 on the image forming drum 1 is transferred from the image forming drum 1 to plain recording paper 37 by heat. As shown in FIG. 3, the pressure-sensitive conductive rubber layer 5 is provided in the image forming drum 1 such that the layer is sandwiched between the inner conductive layer 4 and the outer conductive layer 6. The outer conductive layer 6 is connected to the ground potential, and a power source 38 for fixing is connected between the inner and outer conductive layers 4 and 6. The image forming drum 1 and the recording paper 37 are urged against each other by a pressure roller 39. A pressure is applied only to this urged portion of the pressure-sensitive conductive rubber layer 5, and the resistivity of this portion is decreased. As a result, a current flows from the fixing power source 38 to the urged portion of the pressure-sensitive conductive rubber layer 5 to generate Joule heat. The toner particles 36 adhered to the surface of the image forming drum 1 are thermally transferred to the recording paper 37 and at the same time fixed on it by this Joule heat, thereby forming a toner image 40. In this manner, transfer of the toner 36 to the recording paper 37 is performed by melting and adhering the toner 36 to the recording paper 37 by heat. Therefore, even such conductive toner particles can be easily transferred to plain paper.

After the toner image is transferred to the recording paper, the image forming drum is cleaned by a cleaner unit 41. Since a toner offset inhibiting layer is generally formed, toner does not remain on the image forming drum in an amount by which an image to be formed next is adversely affected even if the cleaner unit 41 is omitted. The cleaner unit 41 is effective when even a small amount of toner must not be allowed to remain on the drum. This cleaner unit 41 has a rubber blade for scraping off the residual toner from the surface of the image forming drum. Since the magnetic toner is used in this recording apparatus, the drum can also be cleaned by a magnet roller or a combination of the rubber blade and the magnet roller. Lastly, the surface layer of the image forming drum is rubbed by a conductive brush 42 connected to the ground potential to erase the residual potential on the surface. The image forming drum is resued in this condition.

The description has been made assuming that this recording apparatus uses the system proposed by Kotz et. al. as the magnetic stylus recording system, but the process of forming a toner image is not limited to this system. For example, a toner image can be formed on the image forming drum by the method proposed by Okuna et. al. in Japan Hardcopy 91. page 117.

The characteristic features of the recording apparatus shown in FIG. 7 are summarized below. First, since transfer and fixing are performed substantially simultaneously in this apparatus, no independent fixing unit need be provided, and this makes it possible to miniaturize the apparatus. The use of a power-saving fixing unit reduces the consumption power. Since heating is performed from the toner layer side to thermally transfer toner particles, transfer of conductive toner to plain paper can be performed by a small energy. The use of magnetic toner makes triboelectrification unnecessary, and this enables stable recording and also makes the use of energy for triboelectrification unnecessary. The recording voltage is a low voltage of 30 V, so a driving IC can be easily realized. Also, the overall process is performed by a low-voltage process of about 30 V or less. In addition, since no charger means is used and the low-voltage process is adopted as described above, no harmful substance such as ozone is produced. That is, this power-saving, low-voltage, and ozoneless recording apparatus satisfies the characteristic features required for a future recording apparatus.

Figure 1:
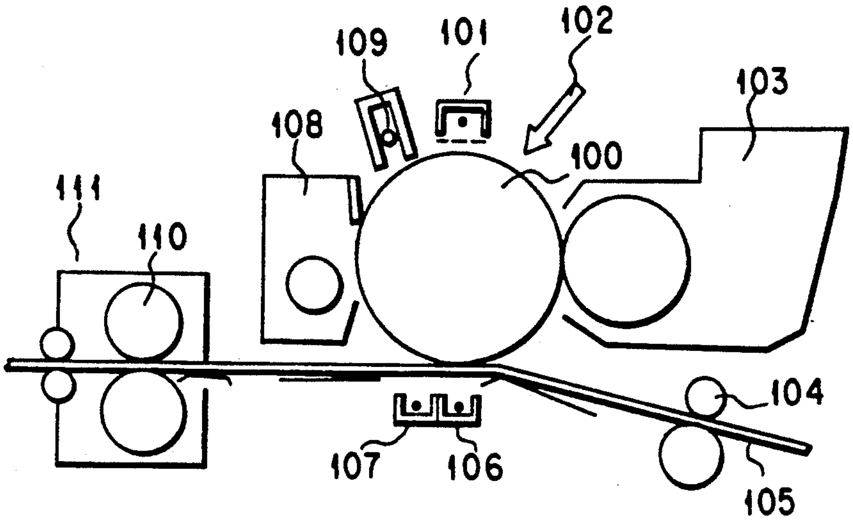
F I G. 1 ( PRIOR ART )
FIG. 1 is a schematic view showing a conventional recording apparatus.
Figure 2:
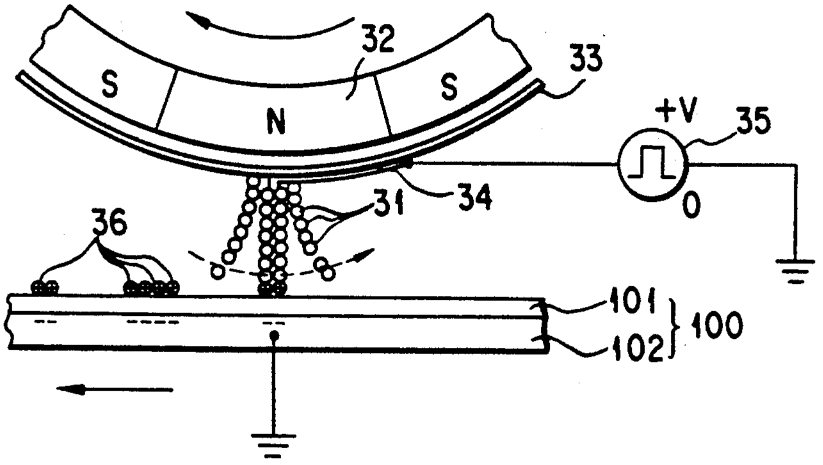
F I G. 2 ( PRIOR ART )
FIG. 2 is a view for explaining a developing step performed in accordance with a conventional magnetic stylus system.
Figure 8:
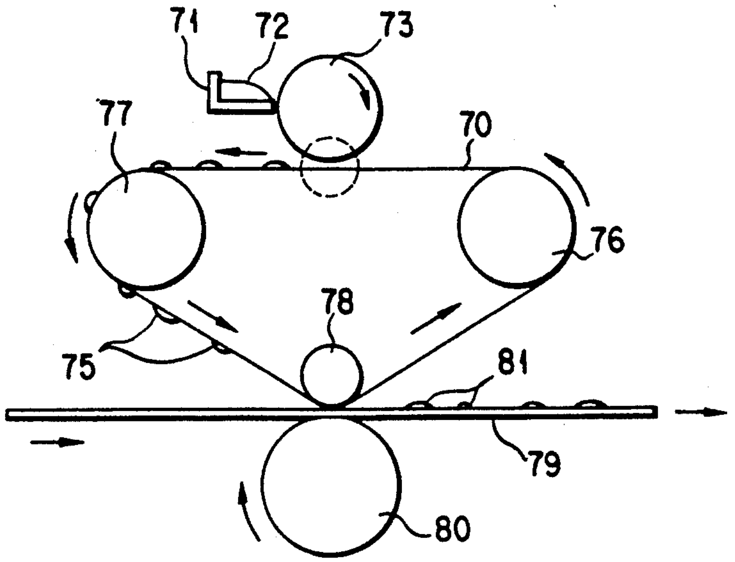
FIG. 8 is a schematic view showing still another recording apparatus according to the first aspect of the present invention.

FIG. 8 shows still another recording apparatus according to the first aspect of the present invention. This recording apparatus uses an endless belt-like image carrier 70 as an image carrier member. Similar to the recording apparatus shown in FIG. 7, this recording apparatus uses the magnetic stylus system. First, conductive magnetic toner 72 stored in a toner supply 71 is carried on a sleeve (not shown) formed outside a magnet roller 73, which is magnetized to have opposite magnetic poles alternately, by rotation of the magnet roller 73 in a direction opposite to the direction of rotation of the magnet roller 73. The conductive magnetic toner 72 is thus carried to a recording region 74 in contact with the image carrier 70. A large number of recording electrodes as shown in FIG. 2 are arranged in this recording region 74. Upon selective application of a voltage of about 30 V to these electrodes, an unfixed toner image 75 consisting of the conductive magnetic toner 72 is formed on the image carrier 70. The image carrier 70 is looped between a drive roller 76, a tension roller 77, and an urging roller 78 and rotated endlessly in a direction indicated by an arrow shown in FIG. 8. The toner image 75 formed in the recording region 74 is moved together with the image carrier 70 as indicated by the arrow to a region where the toner image 75 is transferred to and fixed on recording paper 79. The urging roller 78 and a pressure roller 80 rotate while urging the image carrier 70 against the recording paper 79. Therefore, the recording paper is fed from the left to the right as shown in FIG. 8. The unfixed toner image 75 is transferred to and fixed on the recording paper 79 in this region, thereby forming a fixed toner image 81 on the recording paper 79.

Figure 9:
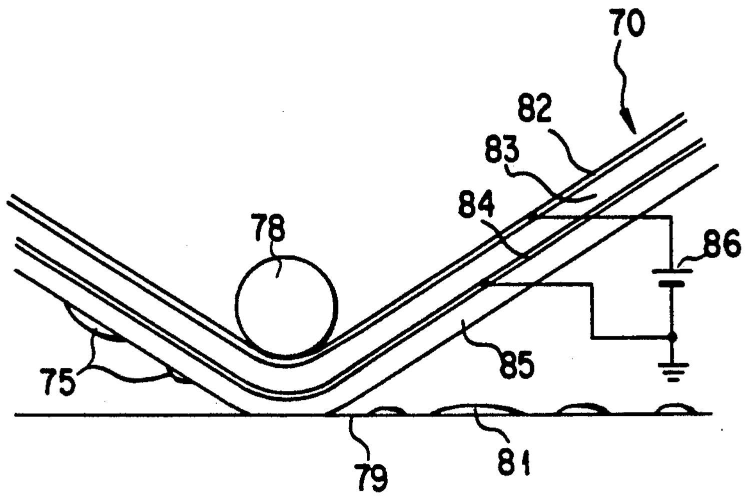
FIG. 9 is an enlarged schematic view showing a transfer/fixing section of the apparatus shown in FIG. 8.

FIG. 9 is an enlarged view showing the section for transferring and fixing the unfixed toner image 75 onto the recording paper 79. As shown in FIG. 9, the image carrier 70 is constituted by a first conductive layer 82, a pressure-sensitive conductive rubber layer 83, a second conductive layer 84, and a dielectric layer 85. The second conductive layer 84 on the side of the dielectric layer 85 is connected to the ground potential, and a power source 86 for fixing is connected to the first conductive layer 82. Power need not be supplied from the fixing power source 86 but may be supplied from the drive roller 76, the tension roller 77, or the urging roller 78 to simplify the arrangement. The unfixed toner image 75 formed on the dielectric layer 85 is fed to the contact portion between the recording paper 79 and the image carrier 70. The image carrier 70 is urged against the recording paper 79 by the urging roller 78. The pressure-sensitive conductive rubber layer 83 is partially applied with the pressure and deformed. Since the resistivity in this urged portion decreases, a current flows from the fixing power source 86 to the pressure-sensitive conductive rubber layer 83 in the urged portion. This current produces Joule heat in the urged portion of the pressure-sensitive conductive rubber layer 83, and the toner image 75 on the dielectric layer 85 is transferred to the recording paper 79 by this heat, thereby forming the fixed image 81.

In the embodiment described so far, the pressure-sensitive conductive rubber layer is formed inside the image forming medium, and a current is flowed only to the urged portion between the pressure-sensitive conductive rubber layer and recording paper so that transfer and fixing of a toner image onto the recording paper are performed simultaneously by heat produced upon application of the current. In the second aspect of the present invention, however, an image forming medium has no heat generating mechanism, and a pressure roller to be urged against the medium consists of pressure-sensitive conductive rubber and generates heat. That is, recording paper is heated from its lower surface side by heat generated by the pressure roller to transfer and fix a toner image formed on the image forming drum onto the recording paper.

The second aspect of the present invention provides a recording apparatus comprising an image carrier member having an image carrier layer, developing agent image forming means for forming a developing agent image by supplying a developing agent on the image carrier layer, and pressurizing means urged against the image carrier layer and including heating means having a first conductor, a pressure-sensitive conductive resin layer formed on the first conductor, and a second conductor formed on the pressure-sensitive conductive resin layer, wherein a recording medium is fed between the image carrier layer and the pressurizing means to transfer the developing agent supplied on the image carrier layer onto the recording medium, and a current is flowed through a pressurized region of the pressurizing means to generate Joule heat, thereby thermally fixing the developing agent transferred to the recording medium by the generated Joule heat.

Figure 10:
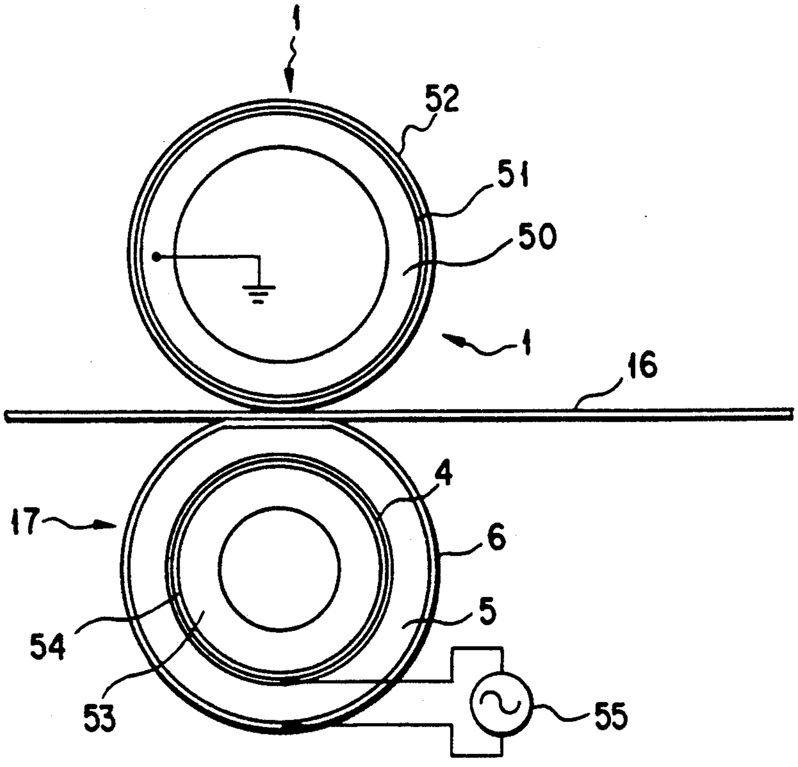
FIG. 10 is a schematic view showing a recording apparatus according to the second aspect of the present invention.

FIG. 10 shows a recording apparatus according to the second aspect of the present invention. An image forming drum 1 is constituted by a conductive drum 50 consisting of, e.g., aluminum and an insulating layer 51 formed on the conductive drum 50. If necessary, an offset inhibiting layer 52 which is also insulating and therefore does not easily allow adhesion of toner may be formed on the insulating layer 51. Note that the apparatus shown in FIG. 10 uses a magnetic stylus recording system used in the apparatus shown in FIG. 7 and that the insulating layer 51 consists of, e.g., alumina. When the apparatus is applied to an ion deposition recording system or an electrostatic recording system, an insulating resin is appropriate as the material of the insulating layer 51. When the apparatus is applied to electrophotographic recording using an optical head, a photoconductive layer is used in place of the insulating layer 51. The conductive drum 50 is connected to the ground potential.

Note that the hard aluminum drum 50 is used in this embodiment, but it is also possible to use a flexible image forming drum 1 obtained by winding a conductive sponge or the like around a core roller.

A pressure roller 17, on the other hand, is obtained by forming a thin heat insulating layer 54 consisting of, e.g., a resin having a low thermal conductivity on a core roller 53. A first conductive layer 4 is formed on the heat insulating layer 54, for example, by a method of vapor-depositing a metal such as aluminum having a low thermal resistivity, a method of coating a conductive paint, or a method of winding a thin metal foil. A pressure-sensitive conductive rubber layer 5 is formed on the first conductive layer 4, and a second conductive layer 6 is formed on the rubber layer 5. A power source 55 for fixing is connected between the inner conductive layer 4 and the outer conductive layer 6 only when needed. In this manner, the structures of the image forming drum 1 and the pressure roller 17 can be simplified. Note that an AC power source is used as the fixing power source 55 in this embodiment although a DC power source is used in the other embodiments. This is so because in the other embodiments, the outer conductive layer is connected to a constant potential, such as the ground potential, and this makes it possible to stably form an image on the image forming drum. In the case of this recording apparatus, it is possible to use not only a DC power source but also an AC power source because no image need be formed on the pressure roller 17.

The image forming drum 1 and the pressure roller 17 are urged against each other via recording paper 16, and the resistivity of the pressure-sensitive conductive rubber 5 in this urged portion decreases. As a result, a current flows from the fixing power source 55 to the pressure-sensitive conductive rubber 5 to generate Joule heat, and a toner image formed on the image forming drum 1 is transferred to the recording paper 16 and at the same time fixed on it by this Joule heat.

The thermal efficiency of this system is lower than those of the other systems described above because recording paper is heated from its lower surface side. Therefore, the system is disadvantageous in increasing an operating speed unless the heating energy is increased. In this system, however, the functions are advantageously shared between the two parts such that the image forming drum is used only in formation of an image while the pressure roller located on the lower surface side of recording paper is used only in transfer and fixing of a toner image. There is another advantage that the structures of the image forming drum and the pressure roller are simplified and therefore these parts are easy to manufacture. This enables application of the apparatus to high-speed recording.

The second aspect of the present invention is not limited to the arrangement shown in FIG. 10. For example, it is possible to constitute a color recording apparatus by connecting a plurality of the apparatuses shown in FIG. 10 in the same manner as the apparatus shown in FIG. 6. When the second aspect of the present invention is to be applied to the apparatus shown in FIG. 8, the arrangement can be the same as that shown in FIG. 8 except that a belt-like image carrier constituted by the dielectric layer 85 and a conductive layer and not including a heating means is used in place of the belt-like image carrier 70, and that a pressure roller similar to the pressure roller 17 shown in FIG. 10 is used as a pressurizing means.

The third aspect of the present invention provides a recording apparatus comprising an image carrier member including an image carrier layer, developing agent image forming means for forming a developing agent image by supplying a developing agent on the image carrier layer, an intermediate image carrier member provided on the image carrier member and including heating means having a first conductor, a pressure-sensitive conductive resin layer formed on the first conductor, and a second conductor formed on the pressure-sensitive conductive resin layer, and an image carrier member layer formed on the heating means, and pressurizing means urged against the image carrier member, wherein after the developing agent image is transferred onto the image carrier member layer, a recording medium is fed between the image carrier member layer having the transferred developing agent image and the pressurizing means to transfer the developing agent image formed on the image carrier member layer onto the recording medium, and a current is flowed through a pressurized region of the intermediate image carrier member to generate a Joule heat, thereby thermally fixing the developing agent image transferred to the recording medium by the generated Joule heat.

Figure 11:
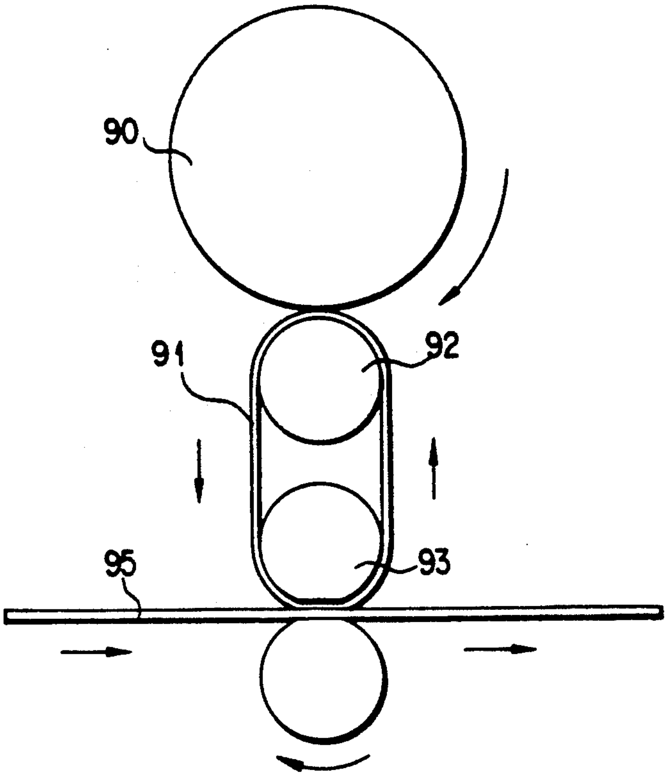
FIG. 11 is a schematic view showing a recording apparatus according to the third aspect of the present invention.

FIG. 11 shows an apparatus according to the third aspect of the present invention.

A toner image is formed on an image forming drum 90. Although a description of this process is omitted, the process can be performed by any recording apparatus, such as an electrophotographic recording apparatus, an electrostatic recording apparatus, an ion deposition recording apparatus, or a magnetic stylus recording apparatus. The toner image formed on the image forming drum 90 is temporarily transferred to an intermediate transfer medium 91. This intermediate transfer medium 91 has a structure similar to that of the endless belt-like image carrier shown in FIG. 9. That is, conductive layers are formed on both surfaces of a pressure-sensitive conductor resin layer, and a power source for fixing is connected between these conductive layers. In addition, an insulating layer is formed on the surface of the intermediate transfer medium 91, and a toner image is carried on this insulating layer. In the recording apparatus shown in FIG. 11, it is necessary to temporarily transfer the toner image formed on the image forming drum 90 to the intermediate transfer medium 91, so the insulating layer is desirably formed of a material capable of easily carrying toner. Therefore, the surface of the intermediate recording medium 91 is formed of, e.g., silicone rubber. The intermediate recording medium 91 is looped between an intermediate transfer roller 92 and an urging roller 93 and rotated endlessly in a direction indicated by an arrow shown in FIG. 11 by these rollers. The intermediate recording medium 91 is urged against the image forming drum 90 by the intermediate transfer roller 92, and the toner image formed on the image forming drum 90 is transferred to the intermediate recording medium 91. The intermediate recording medium 91 is also urged against recording paper 95 by the urging roller 93 and a pressure roller 94. As a result, a current flows through this urged portion of the intermediate transfer medium 91 consisting of pressure-sensitive conductive rubber and generates heat. The toner image temporarily transferred to the intermediate transfer medium 91 is transferred to the recording paper 95 and at the same time fixed on it by this heat.

When the intermediate transfer medium 91 having the above arrangement is used, the size of the apparatus is disadvantageously increased. However, it is possible to almost prevent an influence of the heat generated during transfer and fixing on the image forming drum 90. Especially when a photoconductive layer is formed on the surface of the image forming drum 90 to perform electrophotographic recording using light, an adverse effect caused by heat is serious. The use of the intermediate transfer medium 91 as in the apparatus shown in FIG. 11 eliminates the influence of heat.

The intermediate transfer medium 91 is brought into contact with the image forming drum 90 by the intermediate transfer roller 92. Therefore, it is also possible to facilitate transfer of a toner image from the image forming drum 90 to the intermediate transfer medium 91 by urging these parts with an appropriate pressure to generate a small amount of heat, thereby slightly heating the toner image.

In addition, the pressure roller 94 may be formed of pressure-sensitive conductive rubber as in the apparatus shown in FIG. 10 to use a method in which the recording paper 95 is heated from its lower surface side by the pressure roller 94 or a method in which both the intermediate transfer medium 91 and the pressure roller 94 are caused to generate heat. The intermediate transfer roller 92 can also be formed of pressure-sensitive conductive rubber to slightly heat the intermediate transfer medium 91 from its inner surface side. This also facilitates transfer of toner from the image forming drum 90 to the intermediate transfer medium 91.

Note that this embodiment uses an endless belt as the intermediate transfer medium 91, but the same effects can be obtained by using an intermediate transfer roller having the same structure as this belt.

Figure 12:
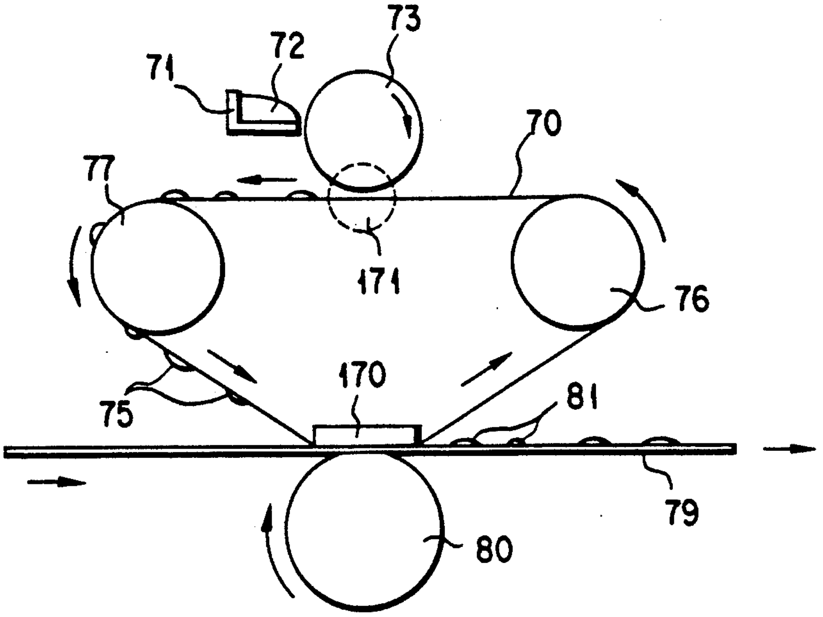
FIG. 12 is a schematic view showing a recording apparatus according to the fourth aspect of the present invention.

FIG. 12 shows a recording apparatus according to the fourth aspect of the present invention.

This recording apparatus uses an endless belt-like image carrier as an image carrier 70. A practical arrangement of the image carrier 70 is similar to that of the image carrier 100 shown in FIG. 2. That is, the image carrier 70 is constituted by a recording layer consisting of an insulator, such as a polyethyleneterephthalate (PET) film, and a conductive layer, such as an aluminum deposition layer, formed on the recording layer. The conductive layer is connected to the ground potential. The belt-like image carrier 70 having this arrangement is looped between a drive roller 76, a tension roller 77, and a heater 170 as supports. The drive roller 76 is a means for moving this belt-like image carrier in a direction indicated by an arrow shown in FIG. 12. The tension roller 77 applies a proper tension to the looped image carrier to enable smooth movement of the image carrier 70. Recording paper 79 and the image carrier 70 are urged against each other by the heater 170 and a pressure roller 80 opposite to the heater. This pressure roller 80 rotates in a direction indicated by an arrow shown in FIG. 12 in accordance with the moving speed of the image carrier 70.

The operation of this recording apparatus will be described below. This recording apparatus uses a magnetic stylus system as a means for forming a developing agent image. First, conductive magnetic toner 72 stored in a toner supply 71 is supplied to the surface of the image carrier and carried on an outer sleeve formed on a magnet roller 73, which is magnetized to have opposite magnetic poles alternately, by rotation of the magnet roller 73 in a direction opposite to the direction of rotation of the magnet roller 73. In this manner, the conductive magnetic toner 73 is carried to a recording region 171 in contact with the image carrier 70. The recording region 171 has a large number of recording electrodes as shown in FIG. 2. Upon selective application of a voltage of about 30 V to these electrodes, an unfixed toner image 75 consisting of the conductive magnetic toner 72 is formed on the image carrier 70. The formed toner image 75 is moved together with the image carrier 70 as indicated by an arrow shown in FIG. 12 to a region urged between the heater 170 and the pressure roller 80. In this region, the toner image 75 is transferred to and fixed on the recording paper 79, thereby forming a fixed toner image 81 on the recording paper.

In transfer and fixing of the unfixed toner image 75 onto the recording paper 79, the conductive magnetic toner 72 forming the unfixed toner image 75 is softened and melted by heat applied from the inner surface side of the image carrier 70 by the heater 170. The softened and melted toner 72 is transferred from the image carrier 70 to the recording paper 79. In addition, since the toner is heated by the heater 170 while it is pressurized by the pressure roller 80, it can be fixed satisfactorily on the recording paper.

Note that a solid planar heater having a heating resistor, for example, can be used as the heater 170. It is also possible to use a heat roller used in a conventional electrophotographic copying machine or laser printer in situations where consumption power need not be taken into consideration.

The apparatus shown in FIG. 12 is not of an electrostatic transfer type, therefore, it is possible to transfer a toner image without causing any deterioration in an image even by using general plain paper as recording paper. Furthermore, since transfer and fixing can be performed simultaneously, no independent fixing unit need be provided. This results in miniaturization of the apparatus.

A toner offset inhibiting layer can be formed on the recording layer of the image carrier 70. An ideal material of the toner offset inhibiting layer is the one having a large contact angle by which good release properties with respect to toner can be obtained. An example of such a material is a coating layer of Teflon or a fluorine resin having a thickness of about 10 μm. The conductive layer of the image carrier 70 can be connected to the ground potential. To obtain this ground potential, the drive roller 76 or the tension roller 77 may be formed of a conductive material, connected to the ground potential, and brought into direct contact with the inner surface of the image carrier. If the conductive layer of the image carrier 70 is kept exposed, an electrical trouble may occur or the conductive layer may be destroyed by contact or friction with the heater. For this reason, an insulating layer may be formed on the conductive layer to protect it. In this case, to connect the conductive layer to the ground potential, the insulating layer is partially opened to bring the conductive layer into contact with the roller.

Figure 13:
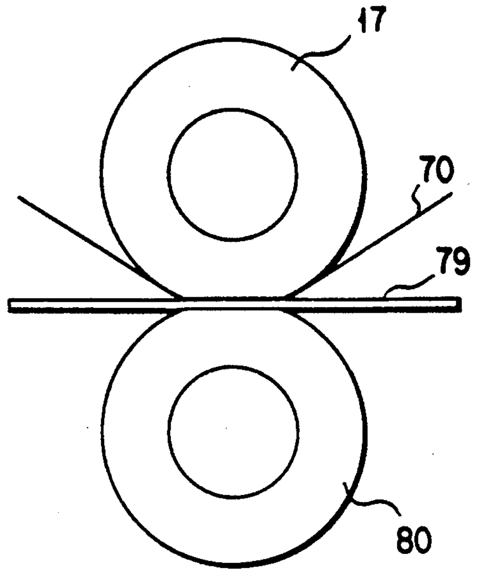
FIG. 13 is a schematic view showing another recording apparatus according to the fourth aspect of the present invention.
Figure 14:
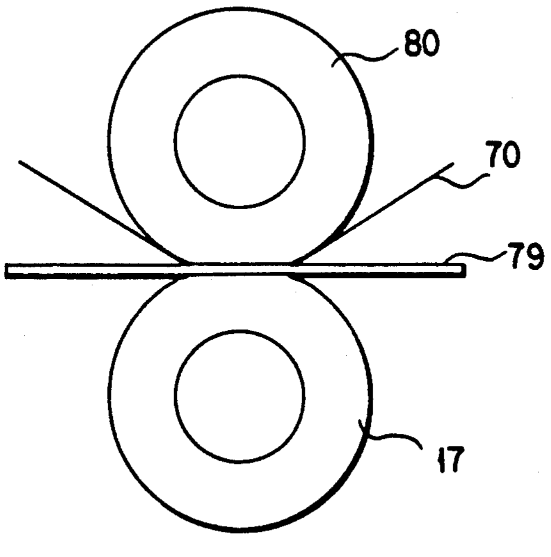
FIG. 14 is a schematic view showing a recording apparatus according to the fourth aspect of the present invention.

FIGS. 13 and 14 are schematic views each showing a transfer/fixing means of another recording apparatus according to the fourth aspect of the present invention. As shown in FIG. 13, in the transfer/fixing means of this apparatus, a roller 17 including a heating means and the pressure roller 80 opposite to the roller 17 are arranged to urge the image carrier 70 and the recording paper 79 against each other. Although the roller 17 including a heating means is located above the image carrier 70 in FIG. 13, it is also possible to dispose the roller 17 below the recording paper 79 and the pressure roller 80 above the image carrier 70 as shown in FIG. 14. The roller 17 including a heating means is similar to the pressure roller 17 shown in FIG. 10 and includes a structure in which first and second conductive layers are formed on both surfaces of a pressure-sensitive conductive rubber layer. When the roller 17 including a heating means and the pressure roller 80 urge against each other as shown in FIG. 13, the resistivity of the pressure-sensitive conductive rubber in this urged region is decreased to $1/10^{-5}$ to $1/10^{-6}$ to flow a current from a power source for fixing connected to it. Since the current flow is concentrated in this urged region, heat is generated in this region. The generated heat is conducted to a toner image on the recording paper 79 through the image carrier 70, thereby fixing the toner image on the recording paper.

In the apparatus shown in FIG. 14, the generated heat is conducted to conductive magnetic toner through the recording paper 79. Since the thermal conductivity of the recording paper 79 is smaller than that of the image carrier 70, a heat loss of the apparatus shown in FIG. 14 is larger than that of the apparatus shown in FIG. 13. However, it is possible to obtain exactly the same effect of satisfactorily transferring and fixing conductive magnetic toner onto plain paper as in the apparatus shown FIG. 13.

In the recording apparatuses shown in FIGS. 13 and 14, transfer and fixing can also be performed by using two rollers 17 each including a heating means without using the pressure roller 80. In this case, recording can be performed at a higher speed.

Figure 15:
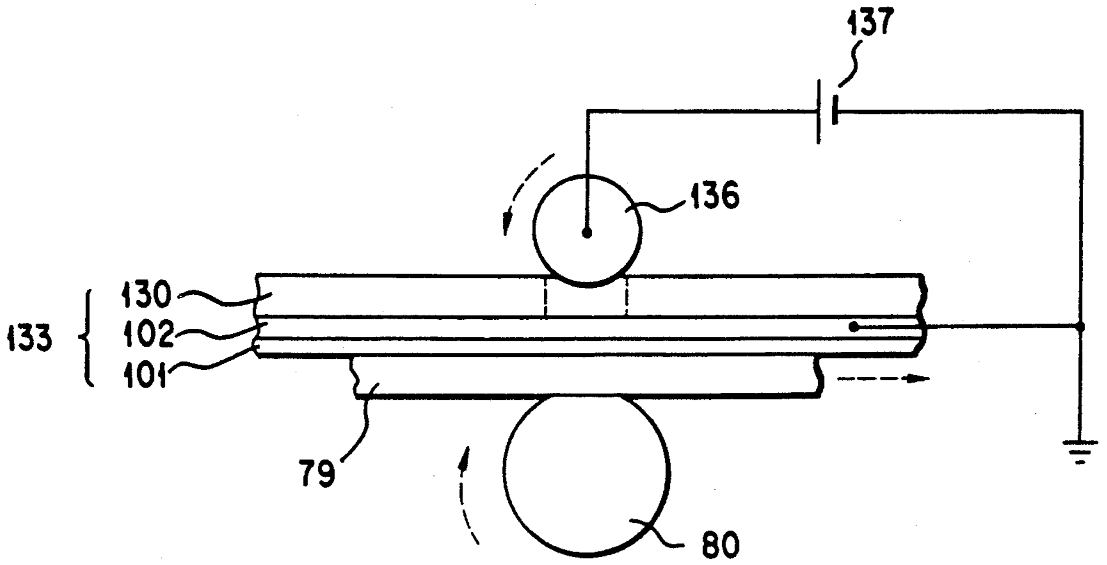
FIG. 15 is a schematic view showing another recording apparatus according to the fourth aspect of the present invention.

FIG. 15 is a schematic view showing a transfer/fixing means of still another recording apparatus according to the fourth aspect of the present invention.

The recording apparatus uses a belt-like image carrier 133 constituted by a recording layer 101 consisting of an insulator, a conductive layer 102 formed on the recording layer 101 and consisting of a deposition film of, e.g., aluminum, and a heating resistor layer 130 formed on the conductive layer 102. The heating resistor layer 130 consists of, e.g., polycarbonate mixed with carbon, conductive rubber, or a pressure-sensitive conductive resin. The image carrier 133 and the recording paper 79 are urged against each other by an electrode roller 136 and the pressure roller 80. The conductive layer 102 is connected to the ground potential. Therefore, the heating resistor layer 130 is partially opened so as not to entirely cover the conductive layer 102. The electrode roller 136 is connected to a positive or negative fixing power source 137. The fixing power source 137 is connected only when transfer and fixing of a toner image are required.

The electrode roller 136 is conductive and urged against the heating resistor layer 130 of the image carrier 133. A current flows from the electrode roller 136 to the fixing power source 137 through the heating resistor layer 130 and the conductive layer 102. The thickness of the heating resistor is at most about 3 mm even when conductive rubber which is formed to have a relatively large thickness is used, so the current flows through a hatched region immediately below the electrode roller 136 shown in FIG. 15. Heat thus generated by the transfer/fixing means shown in FIG. 15 is concentrated in this region.

In the transfer/fixing means shown in FIG. 15, it is also possible to use, in place of the pressure roller 80, a pressure roller or a heat roller containing a pressure-sensitive conductive resin similar to the pressure roller 17 including a heating means used in the apparatus shown in FIG. 10. In this case, recording can be performed at a higher speed.

Figure 16:
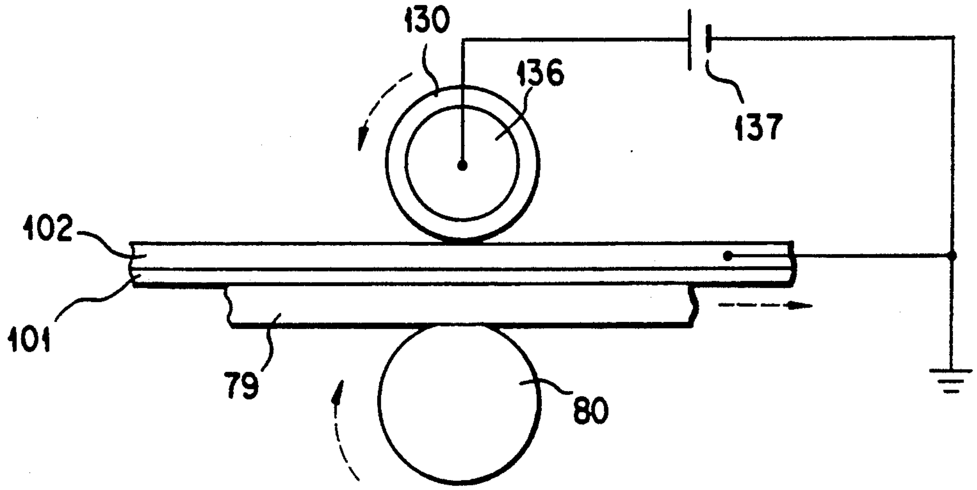
FIG. 16 is a schematic view showing still another recording apparatus according to the fourth aspect of the present invention.

Although the heating resistor layer 130 is formed on the conductive layer 102 in the arrangement shown in FIG. 15, the heating resistor layer 130 need only be located on the conductive layer 102 in a region where transfer and fixing are performed. Instead of the image carrier 133, it is possible to use a combination of an endless belt constituted by a conductive layer 102 alone and an image carrier constituted by a recording layer 101 and a conductive layer 102. In addition, as shown in FIG. 16, the heating resistor layer 136 can be formed on the electrode roller 136. Note that the same reference numerals as in FIG. 15 denote the same parts in FIG. 16.

The recording apparatuses shown in FIGS. 8 to 12 use conductive magnetic toner. An apparatus of this type can perform transfer and fixing simultaneously by performing thermal transfer. In addition, even when plain paper is used as recording paper and an electric charge leaks to the recording paper, fixing can be satisfactorily performed without causing any deterioration in image quality because transfer is performed by the adhesion of toner unlike in the case wherein transfer is performed by an electrostatic force as in electrostatic transfer. In a conventional recording apparatus using conductive magnetic toner, a high pressure is applied in fixing. In the recording apparatus of the present invention, however, no high pressure is applied, and this makes it unnecessary to select a material having a high mechanical strength as the material of the image carrier. This allows the use of an endless belt having flexibility. Since it is also unnecessary to use a means having a high mechanical strength as the pressurizing means for fixing, a small and low-power consumption recording apparatus can be realized. When transfer and fixing are repeatedly performed by applying heat to an image carrier, the image carrier may be sometimes not satisfactorily cooled particularly in high-speed recording. In such a case, the cooling unit used in the apparatus shown in FIG. 4 can be similarly used. Note that the apparatuses shown in FIGS. 8 to 12 can be applied not only to the magnetic stylus system but also to a magnedynamics system.

The recording apparatuses according to the present invention have been described above, but the present invention is not limited to these embodiments. The gist of the present invention is to cause a transfer/fixing region of a recording apparatus to generate heat and simultaneously perform transfer and fixing of a toner image formed on an image carrier member onto a recording medium. Therefore, any arrangement having this function is included in the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A recording apparatus comprising:

an image carrier member including heating means having a first conductor, a pressure-sensitive conductive resin layer formed on said first conductor, and a second conductor formed on said pressure-sensitive conductive resin layer, and an image carrier layer formed on said heating means;

developing agent image forming means for forming a developing agent image by supplying a developing agent on said image carrier layer; and pressurizing means urged against said image carrier member, wherein a recording medium is fed between said image carrier layer and said pressurizing means to transfer the developing agent supplied on said image carrier layer onto the recording medium, and a current is flowed through a pressurized region of said image carrier member to generate Joule heat, thereby thermally fixing the developing agent transferred to the recording medium by the generated Joule heat.

2. An apparatus according to claim 1, wherein said image carrier member is a roller-like member.

3. An apparatus according to claim 1, wherein said image carrier member is a belt-like member.

4. An apparatus according to claim 1, wherein said image carrier layer consists of a dielectric layer, and said developing agent image forming means comprises ion deposition recording means.

5. An apparatus according to claim 1, wherein said image carrier layer consists of a photoconductive layer, and said developing agent image forming means comprises exposing means.

6. An apparatus according to claim 1, wherein said image carrier layer consists of an insulating layer, and said developing agent image forming means comprises magnetic stylus recording means.

7. An apparatus according to claim 1, wherein said image carrier member further comprises cleaning means for removing the transferred and fixed developing agent.

8. An apparatus according to claim 1, wherein said image carrier member further comprises cooling means for cooling said image carrier member heated in the pressurized region.

9. An apparatus according to claim 1, further comprising a heat insulating layer inside said first conductor.

10. An apparatus according to claim 1, further comprising an offset inhibiting layer on said image carrier layer.

11. An apparatus according to claim 1, wherein said first conductor is connected to a positive or negative potential as a heating power source, and said second conductor is connected to a ground potential.

12. An apparatus according to claim 1, wherein the developing agent is conductive.

13. A recording apparatus comprising:

an image carrier member including an image carrier layer;

developing agent image forming means for forming a developing agent image by supplying a developing agent on said image carrier layer;

an intermediate image carrier member provided on said image carrier member and including heating means having a first conductor, a pressure-sensitive conductive resin layer formed on said first conductor, and a second conductor formed on said pressure-sensitive conductive resin layer, and an image carrier member layer formed on said heating means; and pressurizing means urged against said image carrier member, wherein after the developing agent image is transferred onto said image carrier member layer, a recording medium is fed between said image carrier member layer having the transferred developing agent image and said pressurizing means to transfer the developing agent image formed on said image carrier member layer onto the recording medium, and a current is flowed through a pressurized region of said intermediate image carrier member to generate Joule heat, thereby thermally fixing the developing agent image transferred to the recording medium by the generated Joule heat.

14. An apparatus according to claim 13, wherein said image carrier member comprises pressurizing means including heating means having a first conductor, a pressure-sensitive conductive resin layer formed on said first conductor, and a second conductor formed on said pressure-sensitive conductive resin layer.

15. An apparatus according to claim 13, wherein said pressurizing means comprises pressurizing means including heating means having a first conductor, a pressure-sensitive conductive resin layer formed on said first conductor, and a second conductor formed on said pressure-sensitive conductive resin layer.

16. A recording apparatus comprising:

a belt-like image carrier member including a conductive layer and a recording layer formed on said conductive layer;

developing agent image forming means for forming a developing agent image by supplying a conductive developing agent on said recording layer;

heating means provided on said image carrier member; and pressurizing means for activating said heating means by applying pressure to the heating means provided on said image carrier member.

17. An apparatus according to claim 16, wherein said heating means has a first conductor, a pressure-sensitive conductive resin layer formed on said first conductor, and a second conductor formed on said pressure-sensitive conductive resin layer, said heating means and said image carrier member are urged against each other, and a current is flowed through the urged region to generate Joule heat, thereby performing heating.

18. An apparatus according to claim 16, wherein said heating means is a solid planar heater.

19. An apparatus according to claim 16, wherein said heating means is a heat roller.

20. An apparatus according to claim 16, wherein said pressurizing means includes heating means having a first conductor, a pressure-sensitive conductive resin layer formed on said first conductor, and a second conductor formed on said pressure-sensitive conductive resin layer.

21. An apparatus according to claim 16, wherein said heating means is provided on said conductive layer, and said pressurizing means is provided on said recording layer.

22. An apparatus according to claim 16, wherein said pressurizing means is provided on said conductive layer and said heating means is provided on said recording layer.

23. An apparatus according to claim 16, wherein said image carrier member further comprises a heating resistor layer formed on said conductive layer opposite to said recording layer, and said pressurizing means comprises an electrode roller provided on said heating resistor layer and a pressure roller provided on said recording layer opposite to said electrode roller.

24. An apparatus according to claim 16, wherein said heating means comprises an electrode roller provided on said conductive layer and having a heating resistor layer on a surface thereof and a pressure roller provided on said recording layer opposite to said electrode roller.

* * * * *